(12) United States Patent
Jo et al.

(10) Patent No.: US 9,031,496 B2
(45) Date of Patent: May 12, 2015

(54) APPARATUS AND METHOD FOR COMMUNICATION SATELLITE MONITORING

(71) Applicant: Electronics and Telecommunications Research Institute, Daejeon (KR)

(72) Inventors: Jin Ho Jo, Daejeon (KR); Moon Hee You, Daejeon (KR); Won Chan Jung, Daejeon (KR); Jae Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 218 days.

(21) Appl. No.: 13/687,146

(22) Filed: Nov. 28, 2012

(65) Prior Publication Data
US 2013/0137363 A1    May 30, 2013

(30) Foreign Application Priority Data
Nov. 28, 2011 (KR) ........................ 10-2011-0125088

(51) Int. Cl.
*H04B 1/60* (2006.01)
*H04B 17/02* (2006.01)
*H04B 7/185* (2006.01)

(52) U.S. Cl.
CPC ................................. *H04B 7/18519* (2013.01)

(58) Field of Classification Search
USPC ............................................... 455/9, 10, 13.4
See application file for complete search history.

(56) References Cited

U.S. PATENT DOCUMENTS 5,812,932 A * 9/1998 Wiedeman et al. .......... 455/13.1
7,792,485 B2 * 9/2010 Drakos ........................ 455/12.1

FOREIGN PATENT DOCUMENTS

| KR | 1019990042177 B1 | 6/1999 |
| KR | 1020010045474 A | 6/2001 |
| WO | WO 2005/067367 A3 | 7/2005 |

* cited by examiner

*Primary Examiner* — Tuan H Nguyen

(57) ABSTRACT

Provided is an apparatus for monitoring a communication satellite, including: a receiver to receive at least one satellite service signal from a satellite repeater; a measurement unit to measure a frequency, a bandwidth, and a magnitude of the at least one satellite service signal; a controller to determine whether a signal transmitting station malfunctions by comparing the at least one satellite service signal with a predetermined reference value based on the measurement result; and a communication unit to inform an operator terminal about a malfunction of the signal transmitting station when the signal transmitting station is determined to malfunction.

19 Claims, 6 Drawing Sheets

APPARATUS AND METHOD FOR COMMUNICATION SATELLITE MONITORING

CROSS-REFERENCE TO RELATED APPLICATION

This application claims the priority benefit of Korean Patent Application No. 10-2011-0125088, filed on Nov. 28, 2011, in the Korean Intellectual Property Office, the disclosure of which is incorporated herein by reference.

BACKGROUND

1. Field of the Invention

Embodiments of the present invention relate to an apparatus and method for monitoring a satellite communication serviced using a communication broadcasting satellite and a signal of a satellite broadcasting service in an unmanned manner.

2. Description of the Related Art

Due to limited frequency resources and output of a satellite repeater, a satellite operation institution may assign a frequency, a bandwidth, and an output using a most reasonable method and thereby allow a service with respect to a large number of satellite services of which use is requested in advance, so that a large number of applicants may utilize a satellite.

When a satellite communication broadcasting service is initiated, the satellite operation institution may monitor whether a frequency, a frequency bandwidth, and an output of a signal being serviced observes the allowed content by monitoring a satellite signal being serviced.

When a service that uses a frequency or an output violating the allowed content is detected, the satellite operation institution may need to inform a user about the above violation and to take a corrective action.

The satellite operation institution may monitor a satellite service signal using a communication satellite monitoring system.

The communication satellite monitoring system may include a large antenna for receiving a satellite service signal, radio frequency (RF) equipment, measurement equipment, and the like. To operate the communication satellite monitoring system, a plurality of operators always monitors a satellite service signal at work and thus, huge manpower may be required.

SUMMARY

According to an aspect of the present invention, there is provided a system for monitoring a communication satellite, including: a signal transmitting station to transmit at least one satellite service signal; a satellite repeater to receive the at least one satellite service signal and to transmit the at least one satellite service signal to a ground; and a communication satellite monitoring apparatus to monitor whether the signal transmitting station malfunctions by comparing the at least one satellite service signal with a predetermined reference value.

The signal transmitting station may transmit the at least one satellite service signal within an assigned center frequency, frequency band, and output range.

According to another aspect of the present invention, there is provided an apparatus for monitoring a communication satellite, including: a receiver to receive at least one satellite service signal from a satellite repeater; a measurement unit to measure a frequency, a bandwidth, and a magnitude of the at least one satellite service signal; a controller to determine whether a signal transmitting station malfunctions by comparing the at least one satellite service signal with a predetermined reference value based on the measurement result; and a communication unit to inform an operator terminal about a malfunction of the signal transmitting station when the signal transmitting station is determined to malfunction.

The controller may control the measurement unit to periodically measure the frequency, the bandwidth, and the magnitude of the at least one satellite service signal.

When any one of the frequency, the bandwidth, and the magnitude of the at least one satellite service signal exceeds the predetermined reference value, the controller may determine that the signal transmitting station having transmitted the at least one satellite service signal malfunctions.

The communication satellite monitoring apparatus may further include a storage unit to store the measured frequency, bandwidth, and magnitude of the at least one satellite service signal.

According to still another aspect of the present invention, there is provided an apparatus for monitoring a communication satellite, including: an amplifier to amplify at least one satellite service signal that is received from an antenna; a frequency converter to convert a frequency of the amplified at least one satellite service signal; a spectrum analyzer to measure a center frequency, a bandwidth, and a magnitude of the frequency-converted at least one satellite service signal; and a signal calibrator to calibrate the at least one satellite service signal with respect to a reception path section of the antenna and the spectrum analyzer.

The signal calibrator may include: a radio frequency (RF) signal generator to input a calibration signal to the amplifier using a coupler; and an RF power measurement unit to measure a magnitude of the input calibration signal.

The spectrum analyzer may measure a magnitude of the calibration signal that passes through the reception path section, and may calculate a loss value of the reception path section by comparing the measured magnitude of the calibration signal that passes through the reception path section with the magnitude of the calibration signal that is measured by the RF power measurement unit.

The spectrum analyzer may measure the magnitude of the at least one satellite service signal received from the antenna by compensating for the loss value from the magnitude of the frequency-converted at least one satellite service signal.

According to yet another aspect of the present invention, there is provided a method of monitoring a communication satellite, including: transmitting at least one satellite service signal using a signal transmitting station; transmitting the at least one satellite service signal to a ground using a satellite repeater; comparing the at least one satellite service signal with a predetermined reference value; and determining whether the signal transmitting station malfunctions based on the comparison result.

According to a further another aspect of the present invention, there is provided a method of monitoring a communication satellite, including: receiving at least one satellite service signal from a satellite repeater; measuring a frequency, a bandwidth, and a magnitude of the at least one satellite service signal; determining whether a signal transmitting station malfunctions by comparing the at least one satellite service signal with a predetermined reference value based on the measurement result; and informing an operator terminal about a malfunction of the signal transmitting station when the signal transmitting station is determined to malfunction.

According to still another aspect of the present invention, there is provided a method of monitoring a communication satellite, including: amplifying at least one satellite service signal that is received from an antenna; converting a frequency of the amplified at least one satellite service signal; measuring a center frequency, a bandwidth, and a magnitude of the frequency-converted at least one satellite service signal using a spectrum analyzer; and calibrating the at least one satellite service signal with respect to a reception path section of the antenna and the spectrum analyzer.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
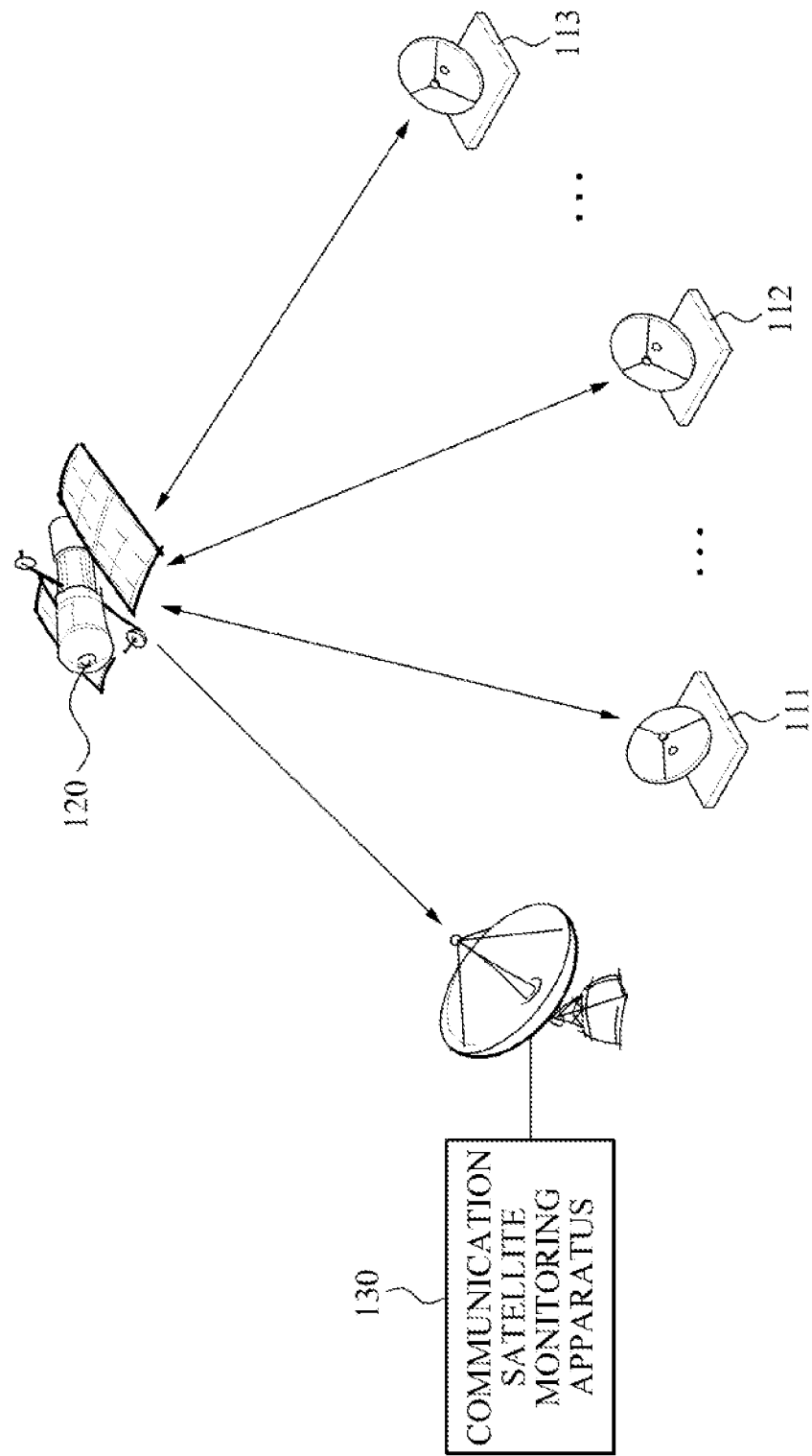
FIG. 1 is a diagram illustrating a configuration of a communication satellite monitoring system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 is a diagram illustrating a configuration of a communication satellite monitoring system according to an embodiment of the present invention.

Referring to FIG. 1, the communication satellite monitoring system may include signal transmitting stations 111, 112, and 113, each to transmit at least one satellite service signal, a satellite repeater 120 to receive the at least one satellite service signal and to transmit the at least one satellite service signal to a ground, and a communication monitoring apparatus 130 to monitor whether each of the satellite service serves 111, 112, and 113 malfunctions by comparing the at least one satellite service signal with a predetermined reference value.

According to an aspect, each of the signal transmitting stations 111, 112, and 113 may transmit the at least one satellite service signal to the satellite repeater 120 within an assigned center frequency, frequency band, and output range.

The satellite repeater 120 may receive a satellite service signal transmitted from a ground, and may frequency-convert and amplify the satellite service signal and thereby transmit the amplified satellite service signal to the ground again.

Since the satellite repeater 120 may provide a service with respect to a wide area, it is possible to receive a satellite service signal without restriction on a place. The communication satellite monitoring apparatus 130 may receive and monitor all the satellite service signals.

Hereinafter, a method of monitoring a communication satellite according to an embodiment of the present invention will be described.

Figure 2:
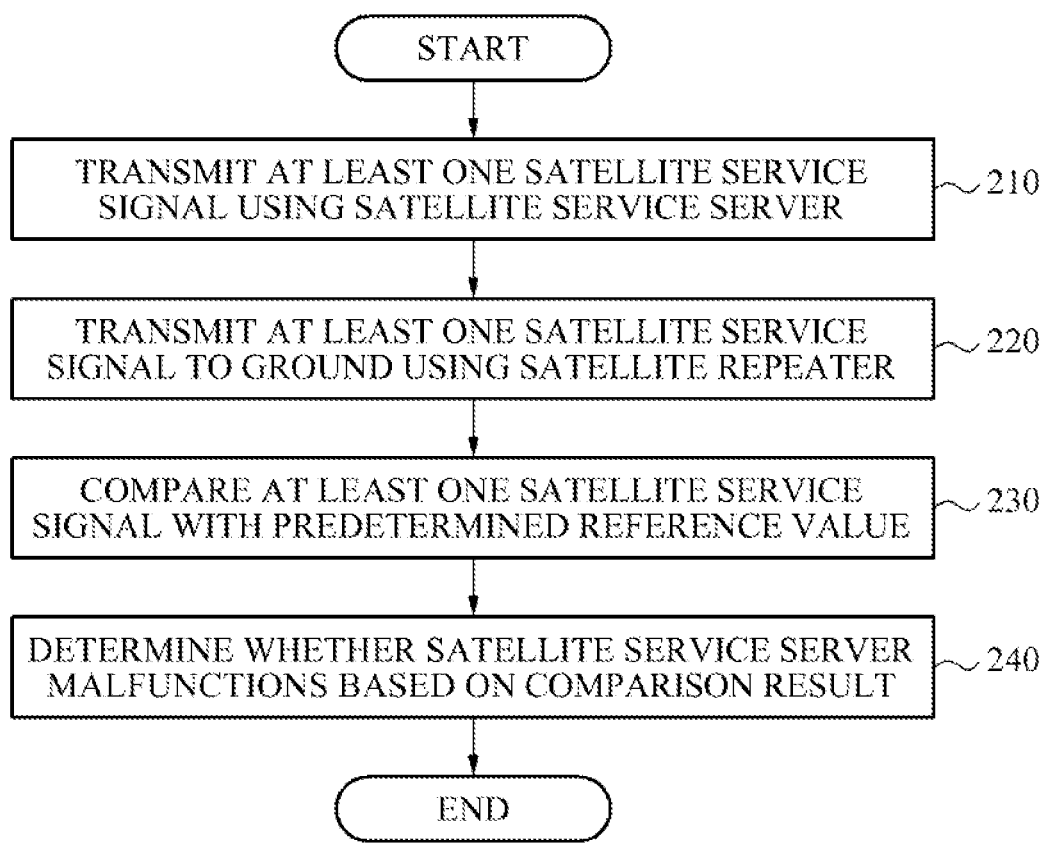
FIG. 2 is a flowchart illustrating a method of monitoring a communication satellite according to an embodiment of the present invention.

FIG. 2 is a flowchart illustrating a method of monitoring a communication satellite according to an embodiment of the present invention.

In operation 210, a communication satellite monitoring system according to an embodiment of the present invention may transmit at least one using satellite service signal using a signal transmitting station.

In operation 220, the communication satellite monitoring system may transmit the at least one satellite service signal to a ground using a satellite repeater.

In operation 230, the communication satellite monitoring system may compare the at least one satellite service signal with a predetermined reference value.

In operation 240, the communication satellite monitoring system may determine whether the signal transmitting station malfunctions based on the comparison result.

Hereinafter, a communication satellite monitoring apparatus according to an embodiment of the present invention will be further described.

Figure 3:
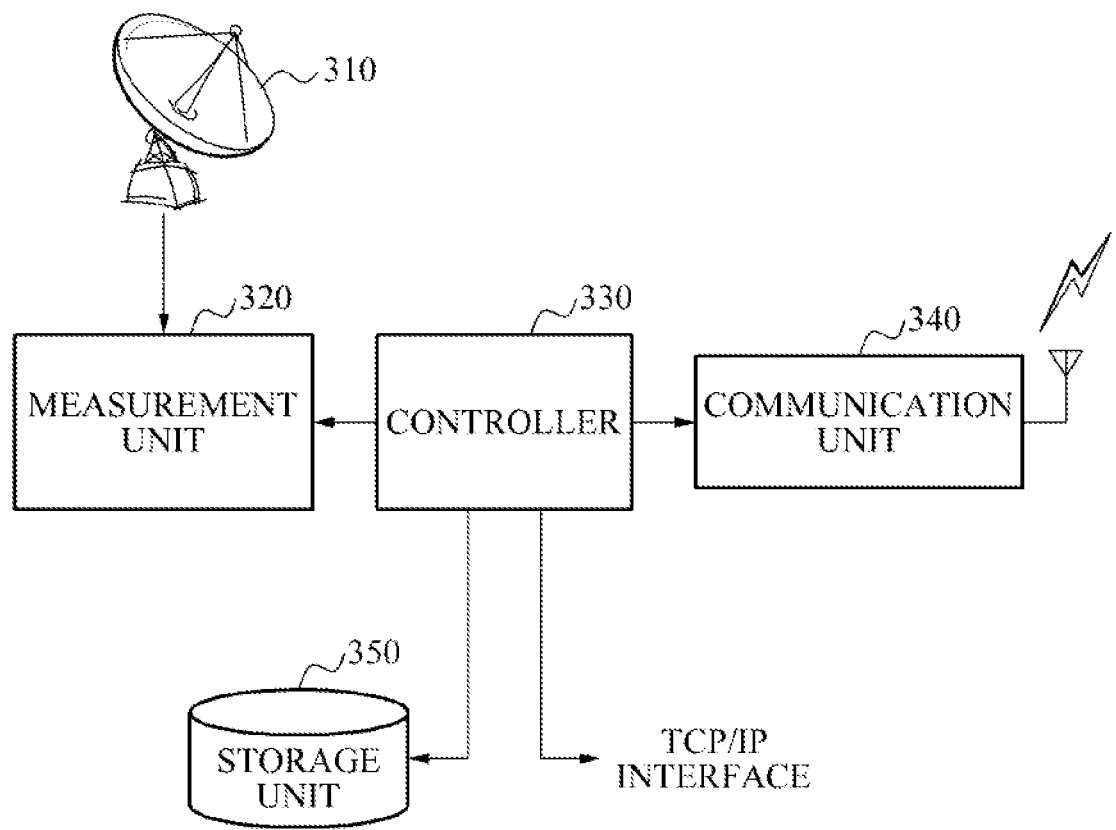
FIG. 3 is a diagram illustrating a configuration of a communication satellite monitoring apparatus according to an embodiment of the present invention.

FIG. 3 is a diagram illustrating a configuration of a communication satellite monitoring apparatus according to an embodiment of the present invention.

Referring to FIG. 3, the communication satellite monitoring apparatus may include a receiver 310 to receive at least one satellite service signal from a satellite repeater, a measurement unit 320 to measure a frequency, a bandwidth, and a magnitude of the at least one satellite service signal, a controller 330 to determine whether a signal transmitting station malfunctions by comparing the at least one satellite service signal with a predetermined reference value based on the measurement result, and a communication unit 340 to inform an operator terminal about a malfunction of the signal transmitting station when the signal transmitting station is determined to malfunction.

The receiver 310 may receive, from the satellite repeater via an antenna, a satellite service signal being currently serviced. The measurement unit 320 may measure a frequency, a bandwidth, and a magnitude of the received satellite service signal using communication satellite monitoring hardware.

The controller 330 may control the measurement unit 320 to periodically measure the frequency, the bandwidth, and the magnitude of the at least one satellite service signal.

The communication satellite monitoring apparatus may be embedded with a program that periodically measures a satellite service signal at time intervals set by the controller 330, and automatically alerts an operator when the measured satellite service signal is beyond the reference value.

The controller 330 may be embedded with a communication satellite monitoring console.

For example, the communication satellite monitoring console may be embedded with a program that controls communication satellite monitoring hardware to measure a satellite service signal, and may control various types of measurement units within the communication satellite monitoring hardware to periodically measure information.

The communication satellite monitoring apparatus may further include a storage unit 350 to store the measured frequency, bandwidth, and magnitude of the at least one satellite service signal.

When any one of the frequency, the bandwidth, and the magnitude of the at least one satellite service signal exceeds the predetermined reference value, the controller 330 may determine that the signal transmitting station having transmitted the at least one satellite service signal malfunctions.

For example, a communication satellite monitoring console may compare a measured frequency, frequency bandwidth, and output of a satellite service signal with a predetermined reference value and may issue, to an operator, an alert in a form of a text message using the communication unit 340 when the measured frequency, frequency bandwidth, and output of the satellite service signal exceeds the reference value.

When the operator receives the alert, the operator may access the communication satellite monitoring apparatus over a remote network such as a TCI/IP interface and the like, and may verify the alerted circumstance by controlling the communication satellite monitoring console.

When the operator receives the alert, the operator may take a corrective action by directly moving to the communication satellite monitoring apparatus, by verifying the alerted circumstance and thereby contacting with a service user who has violated a predetermined condition.

Hereinafter, a method of monitoring a communication satellite using the communication satellite monitoring apparatus of FIG. 3.

Figure 4:
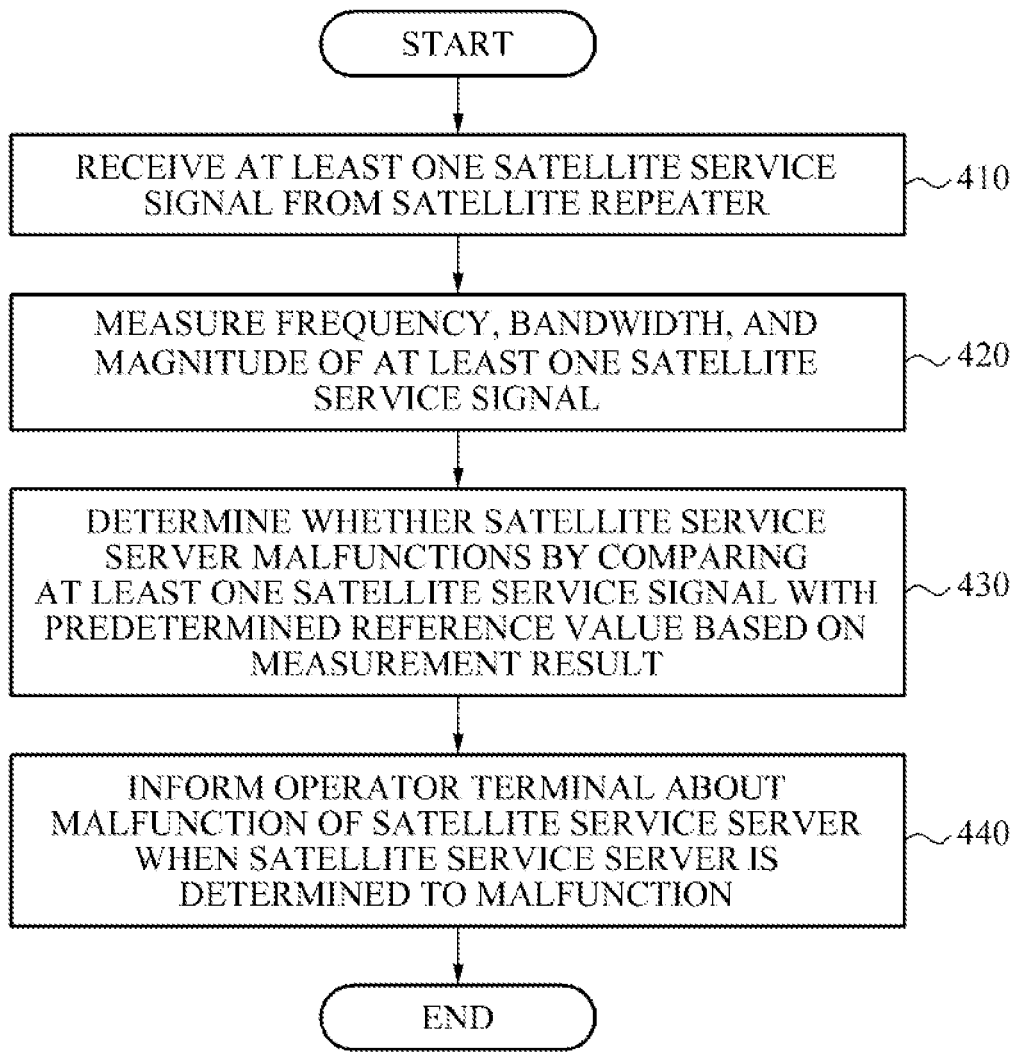
FIG. 4 is a flowchart illustrating a method of monitoring a communication satellite using the communication satellite monitoring apparatus of FIG. 3.

FIG. 4 is a flowchart illustrating a method of monitoring a communication satellite using the communication satellite monitoring apparatus of FIG. 3.

In operation 410, the communication satellite monitoring apparatus may receive at least one satellite service signal from a satellite repeater.

In operation 420, the communication satellite monitoring apparatus may measure a frequency, a bandwidth, and a magnitude of the at least one satellite service signal.

In operation 430, the communication satellite monitoring apparatus may determine whether a signal transmitting station malfunctions by comparing the at least one satellite service signal with a predetermined reference value based on the measurement result.

In operation 440, the communication satellite monitoring apparatus may inform an operator terminal about a malfunction of the signal transmitting station when the signal transmitting station is determined to malfunction.

Hereinafter, a measurement unit of the communication satellite monitoring apparatus will be further described.

Figure 5:
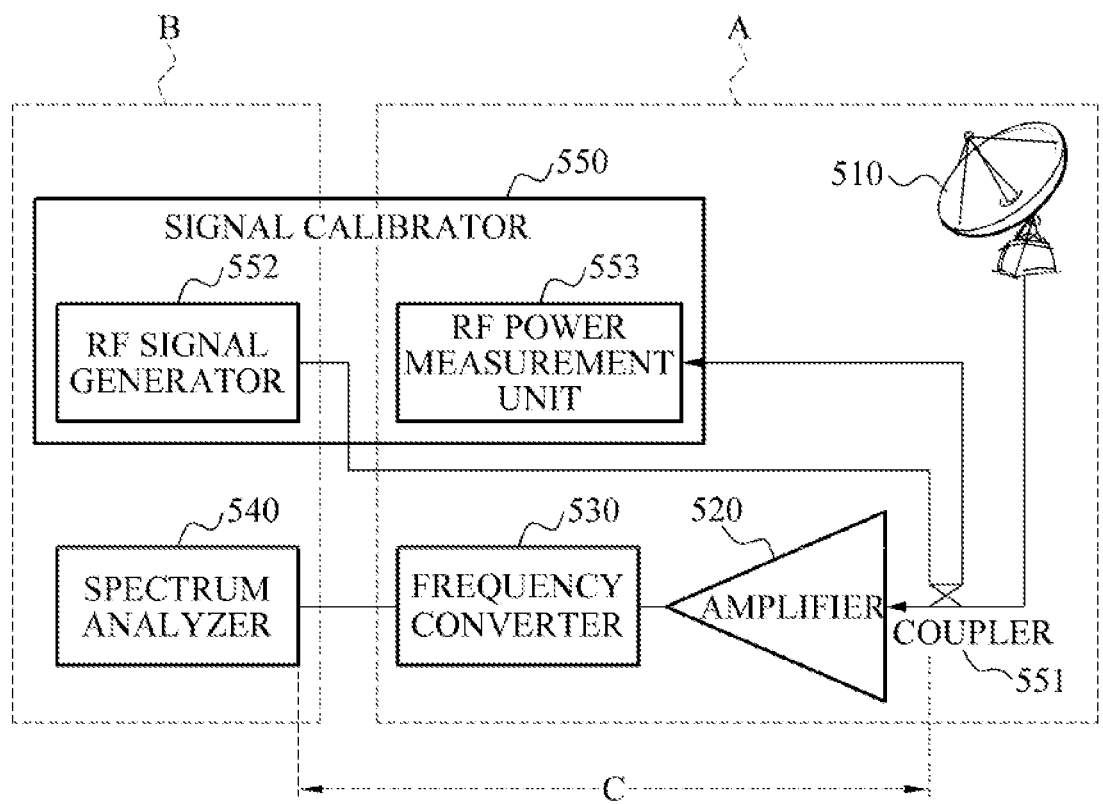
FIG. 5 is a diagram illustrating a measurement unit of a communication satellite monitoring apparatus according to an embodiment of the present invention.

FIG. 5 is a diagram illustrating a measurement unit of a communication satellite monitoring apparatus according to an embodiment of the present invention.

Referring to FIG. 5, the measurement unit of the communication satellite monitoring apparatus may include an amplifier 520 to amplify at least one satellite service signal that is received from an antenna 510, a frequency converter 530 to convert a frequency of the amplified at least one satellite service signal, a spectrum analyzer 540 to measure a center frequency, a bandwidth, and a magnitude of the frequency-converted at least one satellite service signal, and a signal calibrator 550 to calibrate the at least one satellite service signal with respect to a reception path section C of the antenna 510 and the spectrum analyzer 540.

The signal calibrator 550 may include an RF signal generator 552 to input a calibration signal to the amplifier 520 using a coupler 551, and an RF power measurement unit 553 to measure a magnitude of the input calibration signal.

The spectrum analyzer 540 may measure a magnitude of the calibration signal that passes through the reception path section C, and may calculate a loss value of the reception path section C by comparing the measured magnitude of the calibration signal that passes through the reception path section C with the magnitude of the calibration signal that is measured by the RF power measurement unit 553.

The spectrum analyzer 540 may measure the magnitude of the at least one satellite service signal received from the antenna 510 by compensating for the loss value from the magnitude of the frequency-converted at least one satellite service signal.

According an aspect, the measurement unit of the communication satellite monitoring apparatus may be divided into an outdoor apparatus A and an outdoor apparatus B. For example, the antenna 510, the amplifier 520 and the frequency converter 530 corresponding to RF equipment, and the RF power measurement unit 553 may be positioned outdoors, and the spectrum analyzer 540 and the RF signal generator 552 may be positioned indoors.

A configuration of the measurement unit of the communication satellite monitoring apparatus may be divided based on outdoor and indoor. Therefore, even though a frequency of a satellite service signal gradually increases from Ku band to Ka band, it is possible to support band coverage.

For example, in the case of a high frequency signal such as Ka band, the communication satellite monitoring apparatus may initially frequency-convert a signal received from an antenna to be a low frequency band without using a long cable or a waveguide and thereby transmit the frequency-converted signal to an outside. Through this, it is possible to decrease a loss.

Hereinafter, a method of calibrating a satellite service signal using the measurement unit of the communication satellite monitoring apparatus of FIG. 5 will be described.

Figure 6:
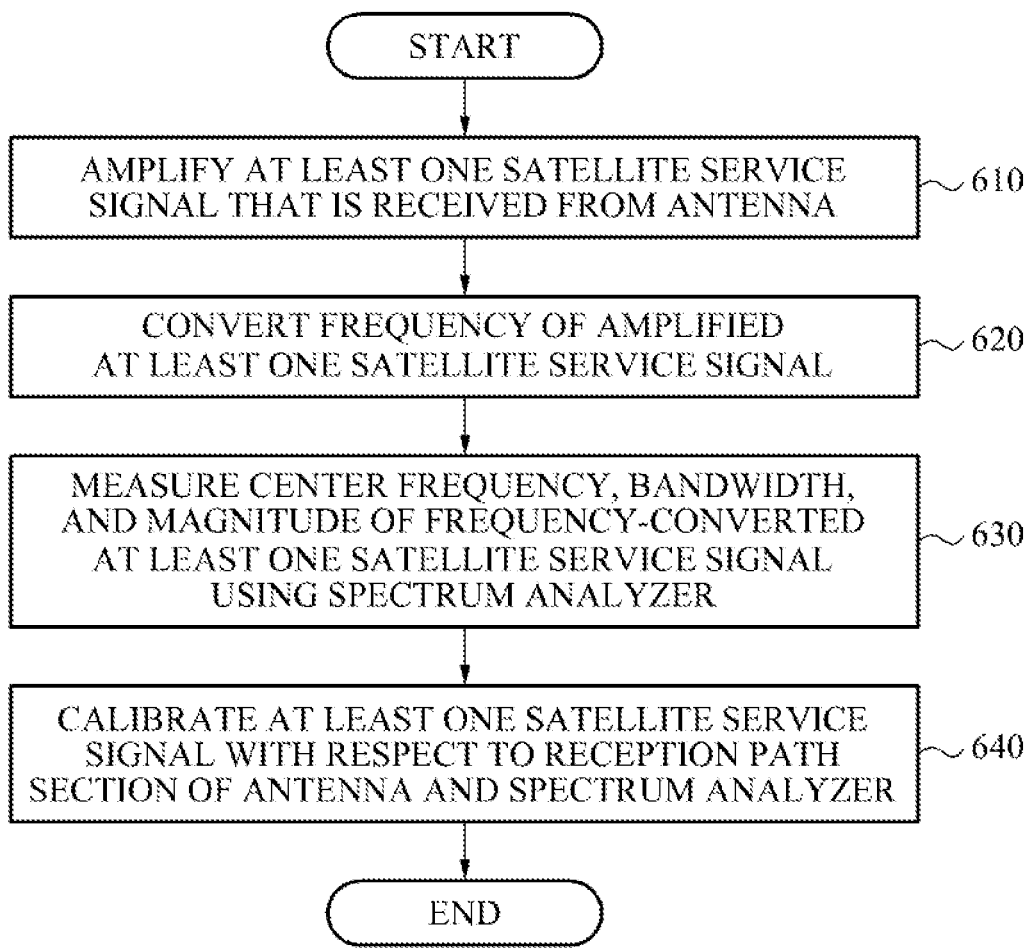
FIG. 6 is a flowchart illustrating a method of calibrating a satellite service signal using the measurement unit of the communication satellite monitoring apparatus of FIG. 5.

FIG. 6 is a flowchart illustrating a method of calibrating a satellite service signal using the measurement unit of the communication satellite monitoring apparatus of FIG. 5.

In operation 610, the measurement unit may amplify at least one satellite service signal that is received from the antenna 510.

In operation 620, the measurement unit may convert a frequency of the amplified at least one satellite service signal.

In operation 630, the measurement unit may measure a center frequency, a bandwidth, and a magnitude of the frequency-converted at least one satellite service signal using the spectrum analyzer 540.

In operation 640, the measurement unit may calibrate the at least one satellite service signal with respect to a reception path section of the antenna 510 and the spectrum analyzer 540.

According to an aspect, the communication satellite monitoring method may periodically measure and store a satellite service signal, and may automatically transmit an alert message to an operator when a measured value is beyond a predetermined reference value.

According to an aspect, the communication satellite monitoring method enables an alert to be automatically issued with respect to measurement of a satellite service signal and violation thereof without using a separate manpower. Accordingly, there is no need to dispatch a fixed manpower for operating a communication satellite monitoring system.

According to embodiments of the present invention, it is possible to provide a communication satellite monitoring system that enables an unmanned operation.

According to embodiments of the present invention, it is possible to measure a satellite service signal and to select a signal transmitting station for a reference value, thereby automatically informing an operator about whether the signal transmitting station malfunctions.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for monitoring a communication satellite, comprising:
   a signal transmitting station to transmit at least one satellite service signal;
   a satellite repeater to receive the at least one satellite service signal from the signal transmitting station and to transmit the at least one satellite service signal to a ground; and
   a communication satellite monitoring apparatus to monitor whether the signal transmitting station malfunctions by comparing the at least one satellite service signal with a predetermined reference value,
   wherein the communication satellite monitoring apparatus includes:
      an amplifier to amplify the at least one satellite service signal that is received from an antenna;
      a frequency converter to convert a frequency of the amplified at least one satellite service signal;
      a spectrum analyzer to measure a center frequency, a bandwidth, and a magnitude of the frequency-converted at least one satellite service signal; and
      a signal calibrator to calibrate the at least one satellite service signal with respect to a reception path section of the antenna and the spectrum analyzer, the reception path section coupling the antenna and the spectrum analyzer.

2. The system of claim 1, wherein the signal transmitting station transmits the at least one satellite service signal within an assigned center frequency, frequency band, and output range.

3. The system of claim 1, wherein the signal calibrator includes:
   a radio frequency (RF) signal generator to input a calibration signal to the amplifier using a coupler; and
   an RF power measurement unit to measure a magnitude of the input calibration signal.

4. An apparatus for monitoring a communication satellite, comprising:
   a receiver to receive at least one satellite service signal from a satellite repeater;
   a measurement unit to measure a frequency, a bandwidth, and a magnitude of the at least one satellite service signal;
   a controller to determine whether a signal transmitting station malfunctions by comparing the at least one satellite service signal with a predetermined reference value based on the measurement result; and
   a communication unit to inform an operator terminal about a malfunction of the signal transmitting station when the signal transmitting station is determined to malfunction,
   wherein the measurement unit includes:
      an amplifier to amplify the at least one satellite service signal that is received from the receiver;
      a frequency converter to convert a frequency of the amplified at least one satellite service signal;
      a spectrum analyzer to measure a center frequency, a bandwidth, and a magnitude of the frequency-converted at least one satellite service signal; and
      a signal calibrator to calibrate the at least one satellite service signal with respect to a reception path section, the reception path section coupling the receiver and the spectrum analyzer of the measurement unit.

5. The apparatus of claim 4, wherein the controller controls the measurement unit to periodically measure the frequency, the bandwidth, and the magnitude of the at least one satellite service signal.

6. The apparatus of claim 4, wherein when any one of the frequency, the bandwidth, and the magnitude of the at least one satellite service signal exceeds the predetermined reference value, the controller determines that the signal transmitting station having transmitted the at least one satellite service signal malfunctions.

7. The apparatus of claim 4, further comprising:
   a storage unit to store the measured frequency, bandwidth, and magnitude of the at least one satellite service signal.

8. The apparatus of claim 4, wherein the signal calibrator includes:
   a radio frequency (RF) signal generator to input a calibration signal to the amplifier using a coupler; and
   an RF power measurement unit to measure a magnitude of the input calibration signal.

9. An apparatus for monitoring a communication satellite, comprising:
   an amplifier to amplify at least one satellite service signal that is received from an antenna;
   a frequency converter to convert a frequency of the amplified at least one satellite service signal;
   a spectrum analyzer to measure a center frequency, a bandwidth, and a magnitude of the frequency-converted at least one satellite service signal; and
   a signal calibrator to calibrate the at least one satellite service signal with respect to a reception path section of the antenna and the spectrum analyzer, wherein the signal calibrator includes:
a radio frequency (RF) signal generator to input a calibration signal to the amplifier using a coupler; and
an RF power measurement unit to measure a magnitude of the input calibration signal.

10. The apparatus of claim 9, wherein the spectrum analyzer measures a magnitude of the calibration signal that passes through the reception path section, and calculates a loss value of the reception path section by comparing the measured magnitude of the calibration signal that passes through the reception path section with the magnitude of the calibration signal that is measured by the RF power measurement unit.

11. The apparatus of claim 10, wherein the spectrum analyzer measures the magnitude of the at least one satellite service signal received from the antenna by compensating for the loss value from the magnitude of the frequency-converted at least one satellite service signal.

12. A method of monitoring a communication satellite, comprising:
transmitting at least one satellite service signal to a satellite repeater using a signal transmitting station;
transmitting the at least one satellite service signal to a ground using the satellite repeater;
comparing the at least one satellite service signal with a predetermined reference value;
determining whether the signal transmitting station malfunctions based on the comparison result; and
calibrating the at least one satellite service signal with respect to a reception path section of an antenna and a spectrum analyzer, the reception path section coupling the spectrum analyzer and the antenna.

13. The method of claim 12, wherein the calibrating includes:
inputting a calibration signal to an amplifier using a coupler; and
measuring a magnitude of the input calibration signal using a radio frequency (RF) power measurement unit.

14. A method of monitoring a communication satellite, comprising:
receiving at least one satellite service signal by a receiver from a satellite repeater;
measuring a frequency, a bandwidth, and a magnitude of the at least one satellite service signal;
determining whether a signal transmitting station malfunctions by comparing the at least one satellite service signal with a predetermined reference value based on the measurement result;
informing an operator terminal about a malfunction of the signal transmitting station when the signal transmitting station is determined to malfunction; and
calibrating the at least one satellite service signal with respect to a reception path section of the receiver and a spectrum analyzer, the reception path section coupling the receiver and the spectrum analyzer.

15. The method of claim 14, wherein the determining comprises determining that the signal transmitting station having transmitted the at least one satellite service signal malfunctions when any one of the frequency, the bandwidth, and the magnitude of the at least one satellite service signal exceeds the predetermined reference value.

16. The method of claim 14, wherein the calibrating includes:
inputting a calibration signal to an amplifier using a coupler; and
measuring a magnitude of the input calibration signal using a radio frequency (RF) power measurement unit.

17. A method of monitoring a communication satellite, comprising:
amplifying at least one satellite service signal that is received from an antenna;
converting a frequency of the amplified at least one satellite service signal;
measuring a center frequency, a bandwidth, and a magnitude of the frequency-converted at least one satellite service signal using a spectrum analyzer; and
calibrating the at least one satellite service signal with respect to a reception path section of the antenna and the spectrum analyzer,
wherein the calibrating includes:
inputting a calibration signal to an amplifier using a coupler; and
measuring a magnitude of the input calibration signal using a radio frequency (RF) power measurement unit.

18. The method of claim 17, further comprising:
measuring a magnitude of the calibration signal that passes through the reception path section; and
calculating a loss value of the reception path section by comparing the measured magnitude of the calibration signal that passes through the reception path section with the magnitude of the calibration signal that is measured by the RF power measurement unit.

19. The method of claim 18, further comprising:
measuring the magnitude of the at least one satellite service signal received from the antenna by compensating for the loss value from the magnitude of the frequency-converted at least one satellite service signal.

* * * * *